United States Patent
Bauer et al.

(10) Patent No.: US 11,453,499 B2
(45) Date of Patent: Sep. 27, 2022

(54) CABIN ARRANGEMENT FOR AN AIRCRAFT, AND AIRCRAFT

(71) Applicant: Airbus Operations GmbH, Hamburg (DE)

(72) Inventors: Michael Bauer, Hamburg (DE); Falk Bajorat, Hamburg (DE)

(73) Assignee: Airbus Operations GmbH

( * ) Notice: Subject to any disclaimer, the term of this patent is extended or adjusted under 35 U.S.C. 154(b) by 660 days.

(21) Appl. No.: 16/433,114

(22) Filed: Jun. 6, 2019

(65) Prior Publication Data
US 2020/0002001 A1 Jan. 2, 2020

(30) Foreign Application Priority Data
Jun. 28, 2018 (DE) ...................... 10 2018 210 639.8

(51) Int. Cl.
*B64D 11/04* (2006.01)
*G03B 21/58* (2014.01)

(52) U.S. Cl.
CPC .............. *B64D 11/04* (2013.01); *G03B 21/58* (2013.01)

(58) Field of Classification Search
CPC . B64D 11/04; B64D 11/0007; B64D 11/0015; B64D 11/00155; B64D 11/00153
See application file for complete search history.

(56) References Cited

U.S. PATENT DOCUMENTS

| | | | | |
|---|---|---|---|---|
| 9,205,914 | B1 * | 12/2015 | Fagan | ............... B64C 19/00 |
| 2011/0220527 | A1 | 9/2011 | Baatz | |
| 2013/0259612 | A1 * | 10/2013 | Guering | ............... B64D 11/04 414/260 |
| 2015/0042494 | A1 | 2/2015 | Garrettson | |
| 2015/0232168 | A1 * | 8/2015 | Kircher | .................. F21V 3/049 244/119 |
| 2017/0057638 | A1 * | 3/2017 | Chen | ................ B64D 11/0015 |
| 2017/0134786 | A1 | 5/2017 | Dame et al. | |
| 2017/0255291 | A1 * | 9/2017 | Hinson | ............... G03B 21/145 |
| 2018/0047322 | A1 * | 2/2018 | Ano | ........................ G09G 3/02 |

FOREIGN PATENT DOCUMENTS

| | | | |
|---|---|---|---|
| DE | 102016100949 A1 | 7/2017 | |
| DE | 102018010242 A1 | 8/2019 | |
| EP | 3075650 A1 * | 10/2016 | ............. B64C 1/061 |
| EP | 3471506 A1 | 4/2019 | |
| WO | 2017026962 A1 | 2/2017 | |

(Continued)

OTHER PUBLICATIONS

Great Britain Search Report for Application No. 1909247.7 dated Nov. 26, 2019, one page.

(Continued)

*Primary Examiner* — Richard R. Green
*Assistant Examiner* — Arfan Y. Sinaki
(74) *Attorney, Agent, or Firm* — Lerner, David, Littenberg, Krumholz & Mentlik, LLP

(57) ABSTRACT

A cabin arrangement for an aircraft, includes a galley monument, which has at least one projection surface, and a projector device by which graphical information can be projected onto the at least one projection surface. Furthermore, an aircraft is described which has at least one such cabin arrangement with the galley monument.

12 Claims, 2 Drawing Sheets

(56) References Cited

FOREIGN PATENT DOCUMENTS

WO 2017125491 A1 7/2017

OTHER PUBLICATIONS

Virtuelle Datentastatur (Virtual data keyboard—version difference) from Wikipedia, die freie Enzyklopadie. Bearbeitungsstand (edited): Sep. 27, 2017, 09:35 Uhr (Am) URL: https://de.wikipedia.org/w/index.php? title=Virtuelle Datentastatur&diff=169466354&oldid=1311675 10 [abgerufen (retrieved) am Jan. 9, 2020].
German Search Report including Written Opinion for Application No. 10 2018 210 639 8 dated Sep. 18, 2020 10 pages; (p. 2 categorizing the cited references).

* cited by examiner

CABIN ARRANGEMENT FOR AN AIRCRAFT, AND AIRCRAFT

FIELD OF THE INVENTION

The present invention relates to a cabin arrangement for an aircraft, and to an aircraft.

BACKGROUND OF THE INVENTION

Galleys of passenger aircraft typically comprise one or more galley monuments, i.e. individual prefabricated rack- or cupboard-like built-in assemblies, which often have a monolithic basic structure and make various functions available in an integrated way. Such galley monuments usually have slide-in compartments which are intended for receiving containers and/or trolleys or galley carts and/or for receiving various galley components for the preparation of meals and/or drinks. Examples of galley components include hot water boilers, coffee machines, fan-assisted ovens, hot plates, sinks, cool boxes, refrigerators and the like.

In order to make as much space as possible for passengers, it is attempted to integrate the galley monuments in the interior of the aircraft in a manner that saves as much space as possible. In passenger aircraft in particular, however, there is also increasingly the need for service functions and monitoring functions to be available in the cabin. For example, aircraft cabins are often fitted with surveillance cameras, the recorded images of which are shown on a display, so that the flight personnel can constantly keep an eye on the passengers. Furthermore, work assignments for the flight crew or service requests for the flight crew are often displayed via such displays.

Some of these requirements have been the subject matter of what is referred to as the E-CAB-project ("E-enabled Cabin and Associated Logistics for Improved Passenger Services and Operation Efficiency"; cordis.europa.eu), in which a galley monument having a display has been developed.

BRIEF SUMMARY OF THE INVENTION

Aspects of the present invention may provide a cabin concept for an aircraft, the cabin concept providing improved functionality.

According to a first aspect of the invention, a cabin arrangement for an aircraft is provided. The cabin arrangement comprises a galley monument which has at least one projection surface, and a projector device by means of which graphical information can be projected onto the at least one projection surface.

According to a further aspect of the invention, an aircraft having such a cabin arrangement is provided.

A concept on which the invention is based consists in providing a projector device in the manner of a projector, instead of a display device, and using said projector device to project a projection field, which contains graphical information, onto a flat surface of the galley monument. The projection surface of the galley monument can thus continue to be used as a storage surface, work surface or in another manner, as a result of which the utilization of space is considerably improved. A further advantage consists in that a display device can be dispensed with on the galley monument. It is therefore also possible to dispense with conventional protection measures for display devices and the maintenance associated therewith. Furthermore, the provision of separate storage structures for display devices can be dispensed with, as a result of which the available space is better utilized. A further advantage associated therewith consists in that the projection surfaces can be cleaned in a simple manner, and therefore the hygiene in the region of the galley monument is also improved.

Advantageous refinements and developments emerge from the dependent claims which refer back to the independent claims, in conjunction with the description.

According to one embodiment of the cabin arrangement, it is provided that the projector device is configured to project an interactive button as graphical information onto the at least one projection surface. Accordingly, the projection field which is projected onto the projection surface can be used not only for displaying information, but also for the input of control commands. As a result, the functionality of the cabin arrangement is further improved.

In particular, it can be provided that functional units of the cabin arrangement, for example galley components, such as coffee machines, refrigerators or the like, or cabin components, such as cabin lighting, can be controlled via the interactive button.

For realizing a projected interactive button, corresponding projector devices are already known. Such projector devices have one or more optical sensors, for example an infrared sensor, which are configured to detect a movement and/or a change of radiation properties in partial regions of the projection surface.

According to a further embodiment of the cabin arrangement, it is provided that the projector device is fastened to the galley monument. This affords the advantage that a compact cabin arrangement is created. In particular, relative movements between projector device and the projection surface provided on the galley monument are thereby reduced, which improves the image quality.

According to a further embodiment, the projector device is mounted pivotably. In particular, the projector device can be mounted pivotably on the galley monument. This affords the advantage that different surfaces of the galley monument can optionally be used as the projection surface.

According to a further embodiment, the projection device is configured to project the graphical information either onto a first projection surface or onto a second projection surface different from the first projection surface of the galley monument. Accordingly, the projection device can be mechanically stably attached to a fastening structure of the cabin arrangement, such as, for example, to a fastening structure provided on the galley monument or to a fastening structure provided on an interior panelling of the fuselage structure of the aircraft. At the same time, the projection field can be arranged on different points of the galley monument. This can be realized, for example, via a pivotable lens of the projector device.

According to a further embodiment, it is provided that the galley monument has a rack structure with slide-in compartments extending in a depth direction.

In particular, a horizontal projection surface which is oriented transversely with respect to the depth direction can be provided as the projection surface of the galley monument. In particular, a normal vector of the horizontal projection surface is oriented transversely with respect to the depth direction. The horizontal projection surface itself therefore extends along the depth direction. The horizontal projection surface is optionally formed by a storage surface positioned in front of one of the slide-in compartments with respect to the depth direction. Alternatively or additionally, the horizontal projection surface can also be formed by a surface of an extension which can be moved between a slide-in position and an extended position, in which the extension protrudes in relation to the rack structure with respect to the depth direction. Surfaces used conventionally in each case as a storage surface or work surface are therefore used as a projection surface. This makes it easier for the flight crew to intuitively perceive the graphical information in the projection field while working on said surfaces.

According to a further embodiment, a vertical projection surface which is oriented along the depth direction is provided as the projection surface of the galley monument. In particular, a normal vector of the vertical projection surface is oriented along the depth direction. The vertical projection surface itself therefore extends transversely with respect to the depth direction. In particular, the second projection surface can be formed by a front covering closing off a slide-in compartment. As a result, this makes it easier in particular for the flight crew to in particular comprehend graphical information from a relatively great distance, for example if a flight attendant is sitting during take-off or landing on a designated flight attendant seat.

With regard to directional indications and axes, in particular directional indications and axes relating to the profile of physical structures, a path of an axis, of a direction or of a structure "along" another axis, direction or structure is understood here as meaning that these, in particular the tangents that arise at a respective point of the structures, run in each case at an angle of less than 45 degrees, preferably less than 30 degrees, and particularly preferably parallel, to one another.

With regard to directional indications and axes, in particular directional indications and axes relating to the profile of physical structures, a path of an axis, of a direction or of a structure "transversely" with respect to another axis, direction or structure is understood here as meaning that these, in particular the tangents that arise at a respective point of the structures, run in each case at an angle of greater than or equal to 45 degrees, preferably greater than or equal to 60 degrees, and particularly preferably perpendicular, to one another.

BRIEF DESCRIPTION OF THE DRAWINGS

The invention will be explained below with reference to the figures of the drawings. In the figures.

DETAILED DESCRIPTION

Unless stated otherwise, the same reference signs are used in the figures to denote identical or functionally identical components.

Figure 1:
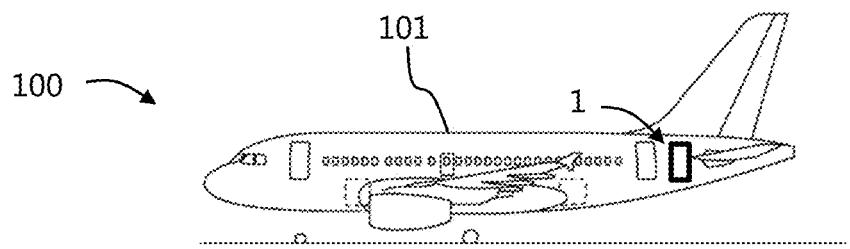
FIG. 1 shows a simplified, schematic view of an aircraft according to an exemplary embodiment of the present invention.
Figure 2:
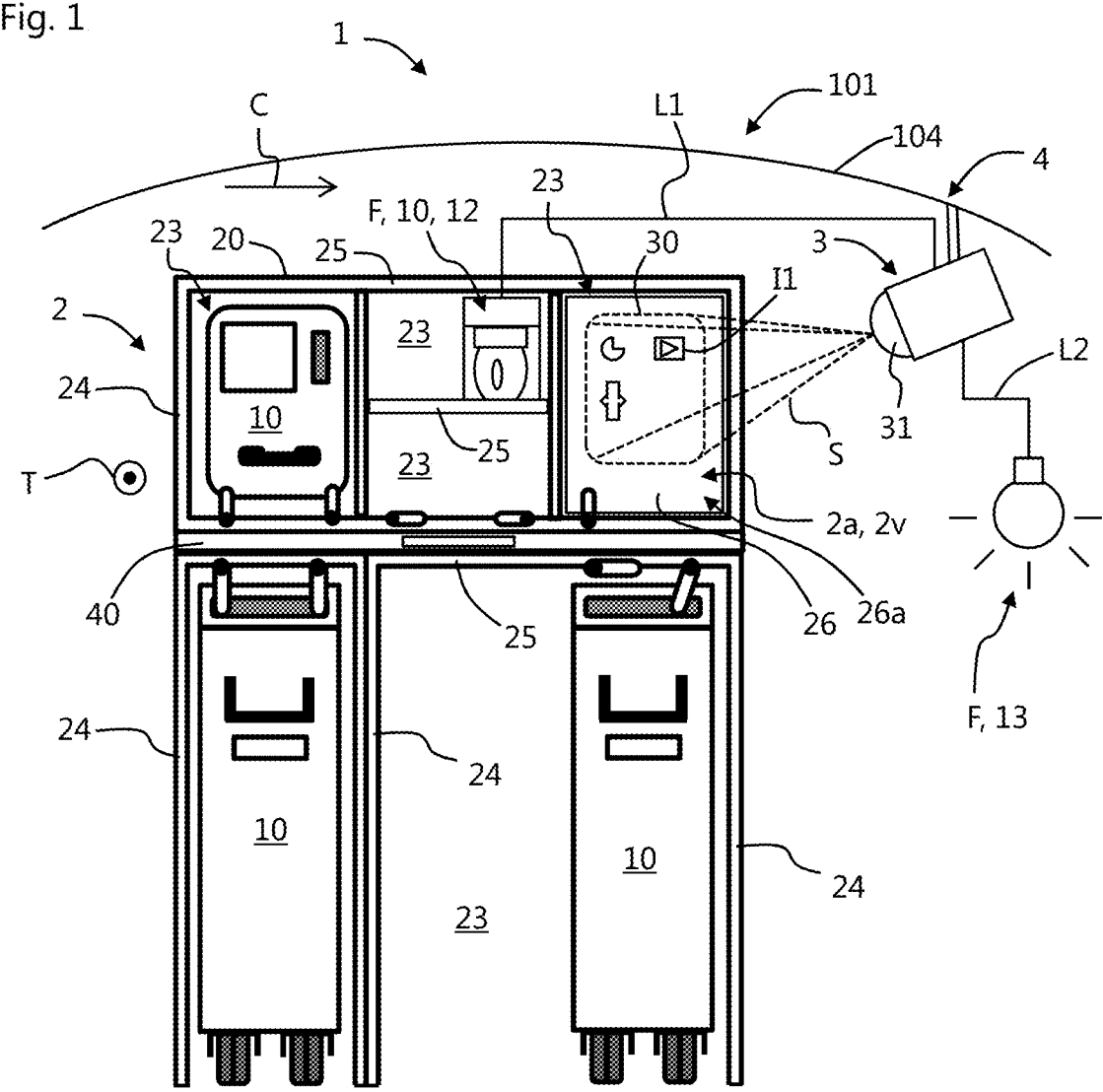
FIG. 2 shows a cabin arrangement according to an exemplary embodiment of the present invention in a schematic top view of a front side of a galley monument of the cabin arrangement.

FIG. 2 shows a schematic front side view of a cabin arrangement 1 having a galley monument 2 and a projector device 3. The cabin arrangement 1 can be provided, for example, in a passenger cabin of an aircraft 100, in particular a passenger aircraft, as is illustrated by way of example in FIG. 1. As can be seen in FIG. 1, the galley monument 2 can be arranged, for example, in the region of the tail of the aircraft 100 close to an entrance area.

The galley monument 2 illustrated in FIG. 2 purely by way of example has a rack structure 20 and an extension 40. The rack structure 20 has one or more slide-in compartments 23. The slide-in compartments 23 are each defined by compartment side walls 24 and compartment transverse walls 25. The compartment side walls 24 and the compartment transverse walls 25, and therefore the slide-in compartments 23, extend in a depth direction T of the galley monument 2, wherein the compartment bottom walls 25 extend transversely with respect to the compartment side walls 23. The slide-in compartments 23 are designed for receiving one or more galley components 10, for example in the form of trolleys or galley carts, as is illustrated in FIG. 2 for the lower slide-in compartments 23, or in the form of boxes, as is illustrated by way of example for the left, upper slide-in compartment 23 in FIG. 2. As is illustrated by way of example in FIGS. 3 and 4, a refrigerator, coffee machines or other objects as galley components 10 can also be accommodated in the slide-in compartments 23. The galley components 10 form functional units F of the cabin arrangement. Further functional units F can be, for example, a lighting system of the cabin of the aircraft or an air-conditioning system (not illustrated) of the cabin of the aircraft. In FIG. 2, by way of example, a coffee machine 12 and a lighting system 13 are illustrated symbolically as functional units F.

The arrangement or division of slide-in compartments 23 that is illustrated in FIG. 2 is purely by way of example. The rack structure 20 can, of course, also have a different arrangement of slide-in compartments 23 extending in the depth direction T than is illustrated in FIG. 2.

Figure 3:
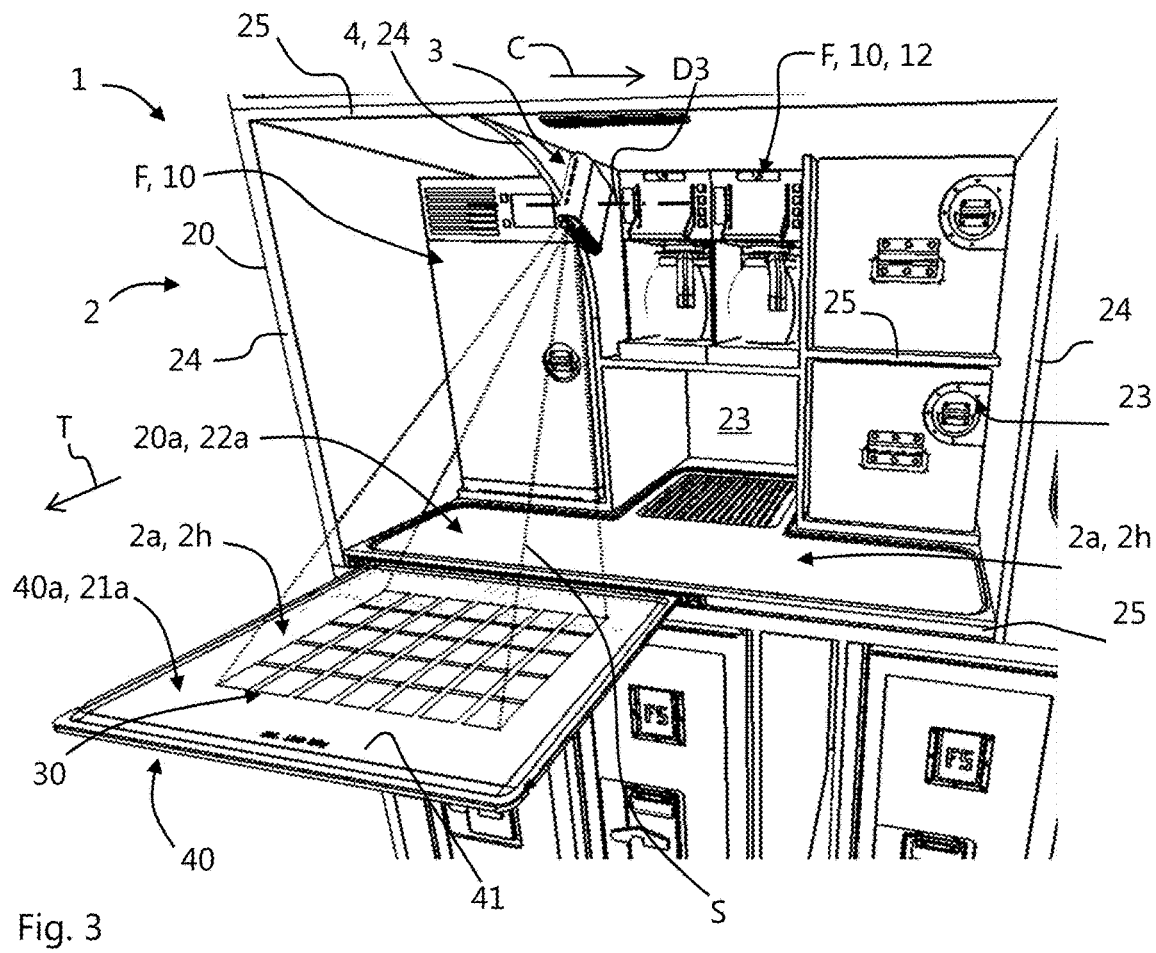
FIG. 3 shows a cabin arrangement according to a further exemplary embodiment of the present invention in a schematic perspective view of a front side of a galley monument of the cabin arrangement.
Figure 4:
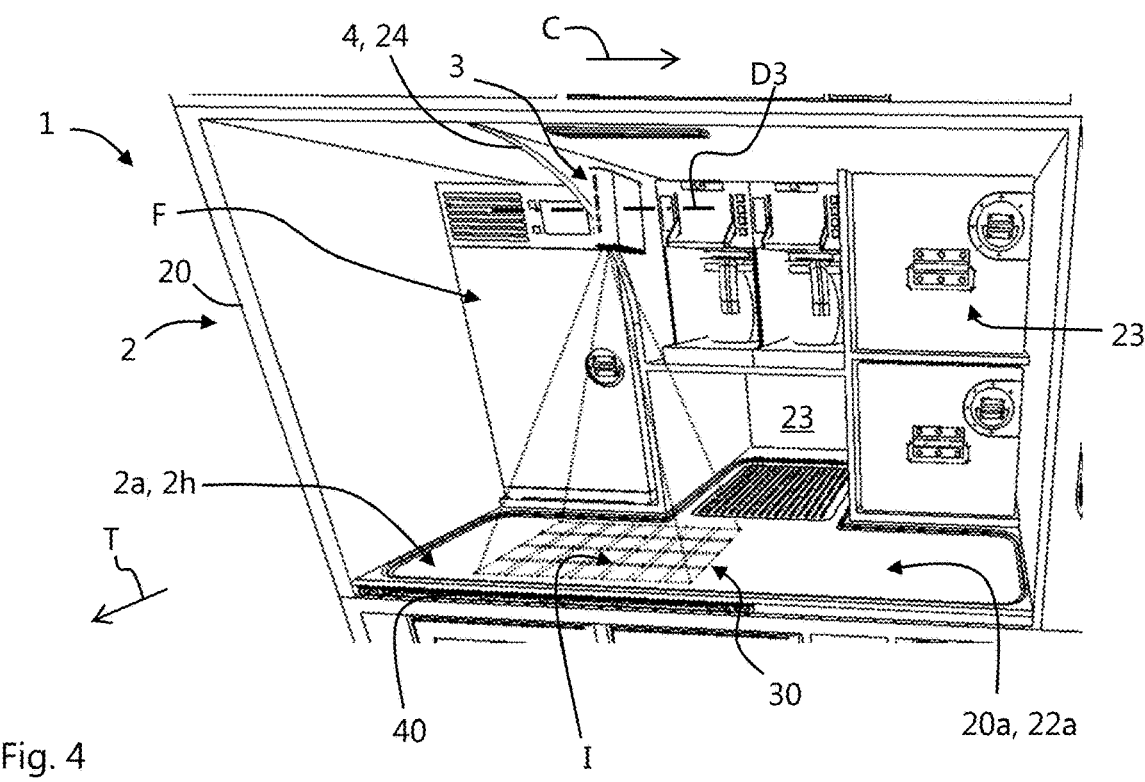
FIG. 4 shows a cabin arrangement according to a further exemplary embodiment of the present invention in a schematic perspective view of a front side of a galley monument of the cabin arrangement.

The extension 40 of the galley monument 2 can be arranged in particular between two slide-in compartments 23, as is illustrated by way of example in FIGS. 2 to 4. In particular, the extension 40 can be arranged between two adjacent compartment transverse walls 25. As can be seen in FIG. 3, the extension 40 has a support plate 41 which extends in a planar manner and has a flat surface 40a. The extension 40 can be moved between a slide-in position and an extended position. The extension 40 is illustrated in the extended position in FIG. 3. As can be seen in FIG. 3, the extension 40 in the extended position protrudes in relation to the rack structure 20, in particular with respect to the depth direction T. In the slide-in position, the extension 40 is at least partially positioned within the rack structure 20, as is illustrated by way of example in FIG. 4. The slide-in position can be defined in particular in that at least 50%, preferably at least 75% and particularly preferably at least 90% of the longitudinal extent of the support plate 41 is arranged within the rack structure 20. For the guiding of the extension 40 between the slide-in position and the extended position, it is possible, for example, for an arrangement, fastened to the rack structure 20, of guide rails (not illustrated) defining an extension direction to be provided.

As is furthermore shown in FIGS. 3 and 4, the galley monument 2 can have a storage surface 20a arranged in front of one of the slide-in compartments 23 with respect to the depth direction T. The storage surface 20a can be formed, for example, by a surface of a compartment transverse wall 25.

In the galley monument 2 shown by way of example in FIGS. 3 and 4, the storage surface 20a extends over an entire width along a transverse direction C of the galley monument 2. In the extended position of the extension 40 with respect to the depth direction T, the support plate 41 of the extension 40 is arranged in front of the storage surface 20a and preferably extends parallel thereto.

As is illustrated by way of example in FIG. 2, one or more slide-in compartments 23 can be closable by a front covering 26. The front covering 26 can be pivotable, for example, between a closed position in which the front covering 26 covers a slide-in opening of the slide-in compartment 23, and a release position in which the front covering 26 releases the slide-in opening of the slide-in compartment 23. In FIG. 2, the front covering 26 is illustrated by way of example in the closed position.

The projector device 3 is intended for projecting graphical information I onto at least one projection surface 2a provided on the galley monument 2. The projector device 3 can be, for example, an LCD projector, a DLP projector or an LED projector. In particular, the projector device 3 can be configured to produce a projection field 30 as an illuminated area on the projection surface 2a, wherein the graphical information I is formed by different luminosities, colours or other optical properties of the projection field 30. The projection field 30 can have, for example, a rectangular circumference, as is illustrated by way of example in FIGS. 2 to 4.

The graphical information I projected can be, for example, images recorded by a video camera (not illustrated), in particular moving images, information about service requests from passengers, or the like.

The projector device 3 is attached to a fastening structure 4 of the cabin arrangement 1. The fastening structure 4 can be formed, for example, by a panelling or support structure 104 of the aircraft fuselage 101, as is illustrated schematically in FIG. 2. The projector device 3 can also be attached directly to the galley monument 2, for example to one of the compartment side walls 24, as is illustrated by way of example in FIGS. 3 and 4. The compartment side wall 24 here forms the fastening structure 4. The projector device 3 can also be mounted on the fastening structure 4 in a manner rotatable about an axis of rotation D3 in order to project the graphical information I either onto a first projection surface 21a or onto a second projection surface 22a different from the first projection surface 21a. Of course, the projector device 3 can also be mounted or attached fixedly on or to the fastening structure 4. In general, the projector device 3 is positioned facing the projection surface 2a of the galley monument 2, in particular is arranged opposite said projection surface, as is illustrated by way of example in FIGS. 2 to 4.

FIG. 2 shows by way of example a galley monument 2 in which the projection surface 2a is formed by a surface 26a of the front covering 26. Said surface 26a is extended transversely with respect to the depth direction T or a normal vector of said surface 26a is oriented along the depth direction T. It is also conceivable to project the projection field 30 onto a different surface of the galley monument 2, which surface is oriented along the depth direction T. In general, the graphical information I can therefore be projected onto a vertical projection surface 2v oriented along the depth direction T.

FIG. 3 shows by way of example the use of the surface 40a of the extension 40, in particular the support plate 41 of the extension 40, as a projection surface 2a. In FIG. 4, the graphical information I or the projection field 30 containing the latter is projected onto the storage surface 20a, which is positioned in front of the slide-in compartments 23 with respect to the depth direction T, as the projection surface 2a. The storage surface 20a and the surface 40a of the extension 40 each extend along the depth direction T or a normal vector of said surfaces 20a, 40a is in each case oriented transversely with respect to the depth direction T. In general, the graphical information I can therefore be projected onto a horizontal projection surface 2h oriented transversely with respect to the depth direction T.

The projection surface 2a formed or provided on the galley monument 2 is preferably flat. Furthermore, it is advantageous if the projection surface is white or generally bright in order to obtain a good contrast and a high-quality illustration of the graphical information.

As can be seen from FIGS. 3 and 4, it can be provided that the graphical information I or the projection field 30 can be projected either onto a first projection surface 21a or onto a second projection surface 22a different from the first projection surface 21a. In the case of the galley monument 2 illustrated by way of example in FIGS. 3 and 4, in the extended position of the extension 40 the surface 40a of the extension 40 forms the first projection surface 21a and the storage surface 20a forms the second projection surface 22a. In order to project the projection field 30 either onto the first or the second projection surface 21a, 22a, the projector device 3 can be pivoted for example about the axis of rotation D3. The projector device 3 furthermore optionally has, for example, a pivotable lens 31 in order to pivot a beam path S which is produced by the projector device 3 and impinges as the projection field 30 onto the projection surface 2a of the galley monument 2. In general, the projector device 3 can be configured to project the graphical information I either onto the first projection surface 21a or the second projection surface 22a.

The projector device 3 can be configured in particular to project an interactive button as graphical information I onto the at least one projection surface 2a. For example, it can be provided that icons I1 are projected onto the projection surface 2a, as is illustrated symbolically in FIG. 2. A certain data input can take place by the operator touching one of said icons I1 For this purpose, the projection device 3 senses or detects the touching of the icon I1, for example by means of an infrared sensor (not illustrated), and produces a signal representing the detection of touching of the corresponding icon I1 As illustrated symbolically in FIG. 2, it can be provided that the projection device 3 is functionally coupled either directly or indirectly via an additional control device (not illustrated) to the functional units F, for example by data lines or by wireless data transmission interfaces, such as a WIFI interface. In FIG. 2, said functional coupling is illustrated symbolically by the lines L1 and L2. The functional units F of the cabin arrangement 1 can generally be optionally controlled via the interactive button.

Although the present invention has been explained above by way of example with reference to exemplary embodiments, it is not restricted thereto, but rather can be modified in diverse ways. In particular, combinations of the above exemplary embodiments are also conceivable.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Cabin arrangement
2 Galley monument
2a Projection surface
2h Horizontal projection surface
2v Vertical projection surface
3 Projector device
4 Fastening structure
10 Galley components
12 Coffee machine
13 Lighting system
20 Rack structure
20a Storage surface
21a First projection surface
22a Second projection surface
23 Slide-in compartments
24 Compartment side walls
25 Compartment transverse walls
26 Front covering
26a Surface of the front covering
30 Projection field
31 Lens
40 Extension
40a Surface of the extension
100 Aircraft
101 Aircraft fuselage
104 Support structure of the aircraft fuselage
C Transverse direction of the galley monument
F Functional units
I Graphical information
I1 Icons
L1, L2 Lines
S Beam path
T Depth direction

The invention claimed is:

1. A cabin arrangement for an aircraft, comprising:
a galley monument comprising at least one projection surface; and
a projector device configured to project graphical information onto the at least one projection surface,
wherein the galley monument has a rack structure with slide-in compartments extending in a depth direction,
wherein a horizontal surface oriented transversely with respect to the depth direction is configured as one of the at least one projection surface of the galley monument, and
wherein the horizontal surface is formed by a surface of an extension configured to be moved between a slide-in position and an extended position, in which the extension protrudes in relation to the rack structure with respect to the depth direction.

2. The cabin arrangement according to claim 1, wherein the projector device is configured to project an interactive button as graphical information onto the at least one projection surface.

3. The cabin arrangement according to claim 2, further comprising a plurality of functional units of the cabin arrangement, at least one of the plurality of functional units configured to be controlled via the interactive button.

4. The cabin arrangement according to claim 1, wherein the projector device is fastened to the galley monument.

5. The cabin arrangement according to claim 1, wherein the projector device is mounted pivotably.

6. The cabin arrangement according to claim 1, wherein the projector device is configured to project the graphical information either onto a first projection surface of the at least one projection surface or onto a second projection surface of the at least one projection surface, wherein the second projection surface is different from the first projection surface of the galley monument.

7. An aircraft with a cabin arrangement according to claim 1.

8. A cabin arrangement for an aircraft, comprising:
a galley monument comprising at least one projection surface; and
a projector device configured to project graphical information onto the at least one projection surface,
wherein the galley monument has a rack structure with slide-in compartments extending in a depth direction,
wherein a vertical surface oriented along the depth direction is configured as one of the at least one projection surface of the galley monument, and
wherein the vertical surface is formed by a front covering closing off one of the slide-in compartments.

9. The cabin arrangement according to claim 8, wherein the projector device is configured to project an interactive button as graphical information onto the at least one projection surface.

10. The cabin arrangement according to claim 9, further comprising a plurality of functional units of the cabin arrangement, at least one of the plurality of functional units configured to be controlled via the interactive button.

11. The cabin arrangement according to claim 8, wherein the projector device is fastened to the galley monument.

12. The cabin arrangement according to claim 8, wherein the projector device is mounted pivotably.

* * * * *